HERBERT O. CORBETT
INVENTOR.

BY E. J. Berry
ATTORNEY

HERBERT O. CORBETT
INVENTOR.

BY *E. J. Berry*
ATTORNEY

HERBERT O. CORBETT
INVENTOR.

BY E. J. Berry
ATTORNEY

HERBERT O. CORBETT
INVENTOR.

BY E. J. Berry
ATTORNEY

United States Patent Office 3,167,814
Patented Feb. 2, 1965

3,167,814
APPARATUS FOR FORMING BLOWN TUBULAR FILMS
Herbert O. Corbett, Canandaigua, N.Y., assignor to National Distillers and Chemical Corporation, New York, N.Y., a corporation of Virginia
Filed July 5, 1961, Ser. No. 122,028
8 Claims. (Cl. 18—14)

The present invention relates to an apparatus for forming blown tubular films from thermoplastic materials. More particularly this invention relates to improved tube forming and cooling procedures, wherein a blown tube is formed by differential air pressure produced by venturi action of the high velocity cooling air directed over the external surfaces of the tube as formed. Specifically this invention relates to an apparatus for forming and cooling blown tubular films from thermoplastic materials wherein the molten plastic material, as discharged from an extrusion die, is immediately passed through a chamber constructed to produce a negative pressure in the chamber surrounding the extruded film in the immediate vicinity of the die lips, and for a limited distance there beyond, by high velocity flow of a gaseous heat transfer medium, such as air, through the chamber.

In the production of blown tubular films of the character contemplated according to this invention, it is conventional to extrude a molten thermoplastic material through a circular die structure, the extruded material being drawn from the die lips by nip rolls mounted at some distance above the die. The formed tube is then inflated by introduction of pressurized air, expanding the tube to form a "bubble" having the desired tube diameter and wall gauge or thickness. Also in accordance with conventional procedures, the expanded tube is passed through an annular cooling zone, wherein a gaseous heat exchange medium, such as air, is caused to impinge directly on the outer surface of the tube.

The inherent nature and mechanical characteristics of the conventional method and apparatus produces an extruded tube wherein the tube, as drawn from the die, remains in a substantially molten condition for some distance beyond the die. In this condition, it is liable to distortion under pressure of the injected inflation air, to tearing at high nip roll speeds, and to low heat transfer rates at such higher speeds. The latter condition results from the fact that the plastic film as extruded is thicker, while having a smaller diameter and surface area, than after it has been expanded to its finished form and dimension. In fact, as the extrusion and draw down rate is increased, and the cooling rate or capacity increased to compensate, the increased velocity of the streams of gaseous cooling medium impinging on the unoriented molten tube material may produce flutter, distortion and eventual rupture of the film.

It is an object of the present invention to provide an apparatus for the accomplishment thereof, whereby molten thermoplastic materials may be extruded to form blown tubular films at extrusion rates which are not substantially limited by the application of high velocity streams of a gaseous heat exchange medium over the surface areas of the extruded films. It is a further object of this invention to provide such method and apparatus wherein a molten thermoplastic material extruded as a blown tubular film is expanded substantially to a finished product diameter and gauge by controlled reduction of pressure from the interior to the exterior of the tube as formed. A still further object of the invention is to prove an apparatus wherein gauging of the formed tube of molten thermoplastic material to predetermined standards of film thickness and tube diameter is accomplished in a zone immediately following and in close proximity to the discharge outlet formed by the extrusion die lips.

The invention and its objects may be more fully understood from the following description, when it is read in conjunction with the accompanying drawings wherein.

Figure 1:
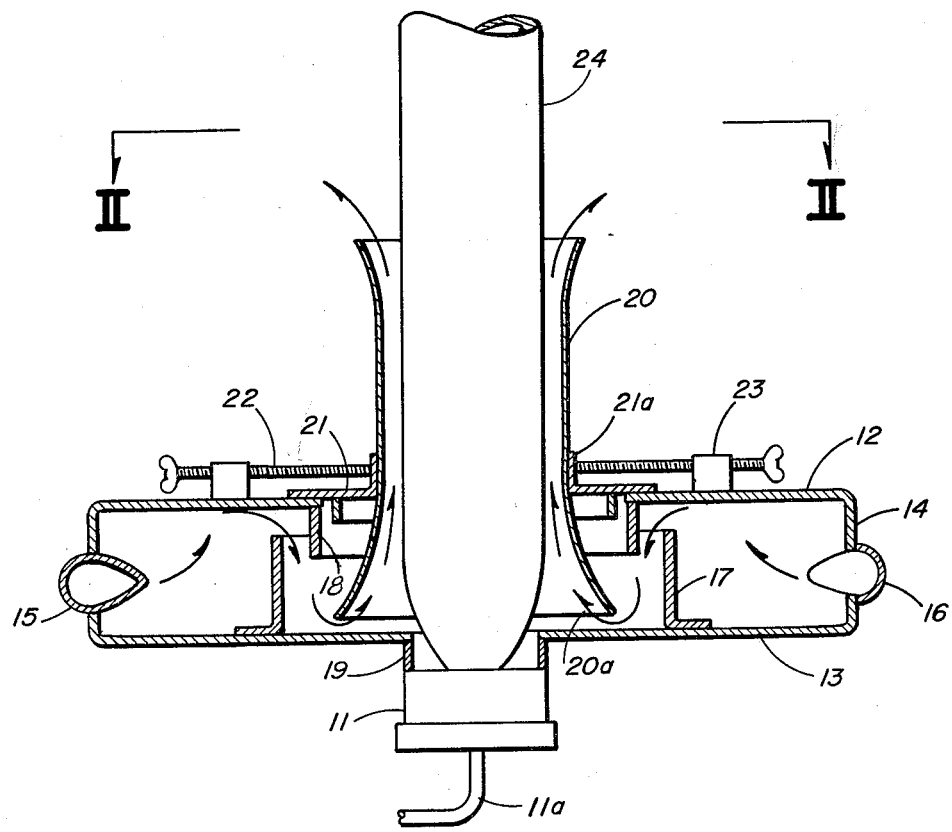
FIG. 1 is a schematic view, partly in vertical section, showing apparatus contemplated by the present invention as applied to a conventional mandrel type die structure for extruding blown tubular films.
Figure 2:
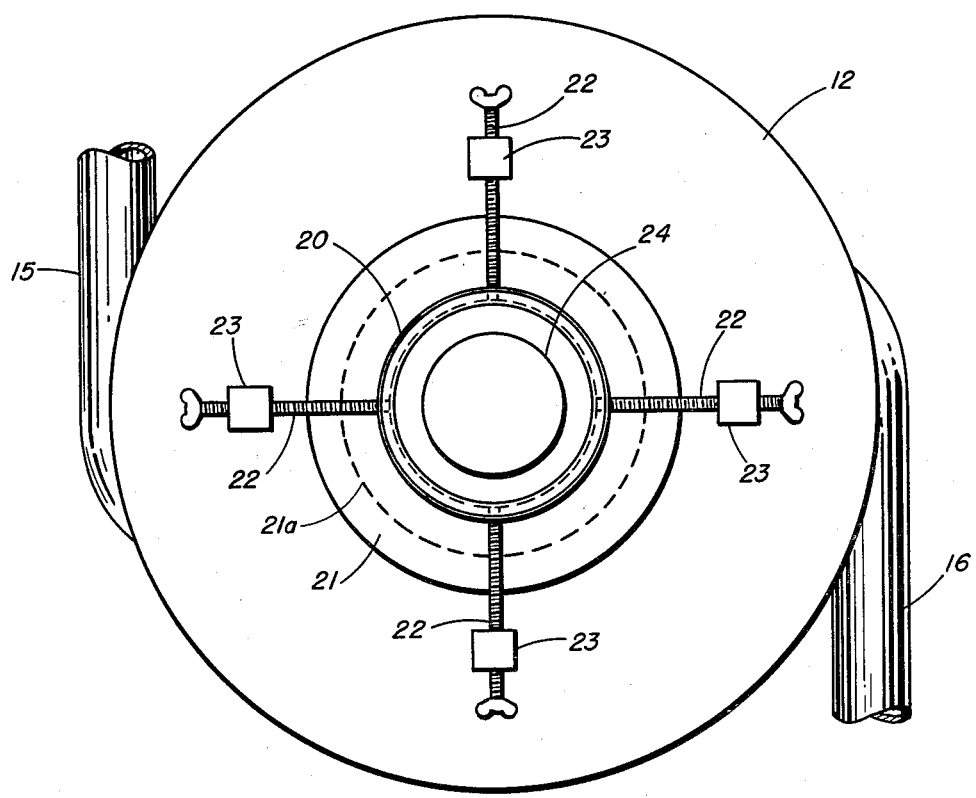
FIG. 2 is a plan view of the apparatus shown in FIG. 1, taken along the line II—II thereof.

Referring now to FIGS. 1 and 2 of the drawings, the numeral 11 designates a mandrel-type extrusion die, adapted for operating association with an extruder machine (not shown) in conventional fashion. Immediately beyond the die, and, supported in closely spaced relation to the die orifice, is an annular plenum chamber which includes two annular wall portions 12 and 13 spaced and joined by a cylindrical side wall portion 14. As more particularly shown in FIG. 2, the cylindrical side wall portion 14 is provided with at least two inlet conduit connections, as indicated by the numerals 15 and 16, for the tangential introduction of pressurized streams of a gaseous medium, such as air, from a suitable source (not shown).

The annular wall portion 13 is characterized by a cylindrical baffle member 17 secured to the inner surface of the annular wall portion 13 intermediate the inner and outer peripheral edges thereof. A similar baffle 18 is secured to the other annular wall portion 12 at the inner peripheral edge thereof. These baffles perform conventional functions of smoothing and distributing air flow through the plenum chamber. A cylindrical spacer element 19, secured to the inner peripheral edge of the annular wall portion 13, and extending outwardly therefrom; provides a closure for the space between the wall portion 13 and the die 11.

The numeral 20 designates a venturi throat element, having a flared end 20a. Although, as shown, the opposite end is extended, and also flared, the element may be of reduced length and the opposite end not flared. The throat element is supported by an annular plate 21, having an upstanding rim portion 21a at the inner periphery thereof which is secured to the throat element. This plate has an overall diameter greater than the central opening of the annular wall portion 12, and is adapted to rest thereon with the flared end of the venturi throat element disposed within the plenum chamber, in spaced relation to the inner surface of the wall portion 13 and below the outer ends of the baffles 17 and 18. The plate, and therewith the throat element is provided for adjustable location with reference to the inner peripheral edge of the wall portion 12 as by means of centering screws 22 acting, through mounting blocks 23, against the rim portion 21a of the plate 21.

In the method contemplated by the present invention, the molten film material is discharged from the die 11 into a zone of pressure below that of the ambient atmosphere, provision being made to induce a pressure no less than atmospheric internally of the tubular form of the film. The means for inducing this pressure internally of the formed tube is of conventional and well known character. For example, a conduit such as designated by the numeral 11a may be extended concentrically through the die mandrel, and air, or another gaseous, material may be injected initially therethrough, or through the film wall.

In either instance the induced pressure is trapped in the film tube between nip rolls for the expanded tube, and the face of the die mandrel.

In the zone surrounding the tube as formed, and in the apparatus illustrated, pressure is reduced below that of the ambient atmosphere, by passing a gaseous material, such as air, through the plenum chamber to be discharged at high velocity through the venturi throat element 20. The venturi action of high velocity air passed through the throat creates a zone of reduced pressure extending outward from the flared end 20a. As the extruded film is drawn from the die by the nip rolls (not shown) the pressure differential from the interior of the film to the interior of the throat causes the film tube to expand. In a typical operation according to the method contemplated this pressure differential initially may be in the range of from about .2″ to about 2″ pounds per square inch.

As the tube expands, however, it reduces the area of the annular space between the outer surface of the tube and the inner surface of the throat. At a determinable stage in the reduction of this area, the pressures in the annular space and in the tube become substantially equal. At this stage, the tube attains a relatively stable cross-sectional dimension. By controlling the flow rate and velocity of the gaseous medium as discharged from the plenum chamber, the diameter of the tube may be established within any reasonably tolerable, desired limits. This diameter however, will always be less than the inner diameter of the throat element employed. Film gauge of the tube is an interrelated function of the degree of expansion produced by the cooling medium flow, the die gauge dimension and the rate of discharge through the die. In FIGS. 1 and 2, the expanded film tube is designated by the numeral 24.

The method now disclosed and claimed, contemplates the normal and consistent employment of film draw rates in the range from about 50 to about 1000 feet per minute, and even higher. By comparison, when using the methods and apparatus common to the prior art, successful production of tubular film at film extrusion or draw rates in excess of 400 feet per minute may be considered to be exceptional.

In this connection, the following tabulation of results obtained under ideal conditions when employing conventional systems and methods, and those normally to be obtained when employing a method and apparatus according to the present invention afford specific basis for comparison. In this tabulation, runs 3 and 4 were accomplished in conventional fashion, while runs 12 and 11 were accomplished by procedures and apparatus according to the present invention.

|  | Run 3 | Run 12 |
|---|---|---|
| 1. Gauge, Mils | 1.02 | 1.01 |
| 2. Layflat width of tube, inches | 9.4 | 9.4 |
| 3. Linear Speed, ft./min | 127 | 207 |
| 4. Output, lbs./hr | 57.8 | 94 |

|  | Run 4 | Run 11 |
|---|---|---|
| 1. Gauge, Mils | 1.05 | 1.05 |
| 2. Layflat width of tube, inches | 9.5 | 9.5 |
| 3. Linear Speed, ft./min | 133 | 186 |
| 4. Output, lbs./hr | 59.5 | 89 |

Figure 3:
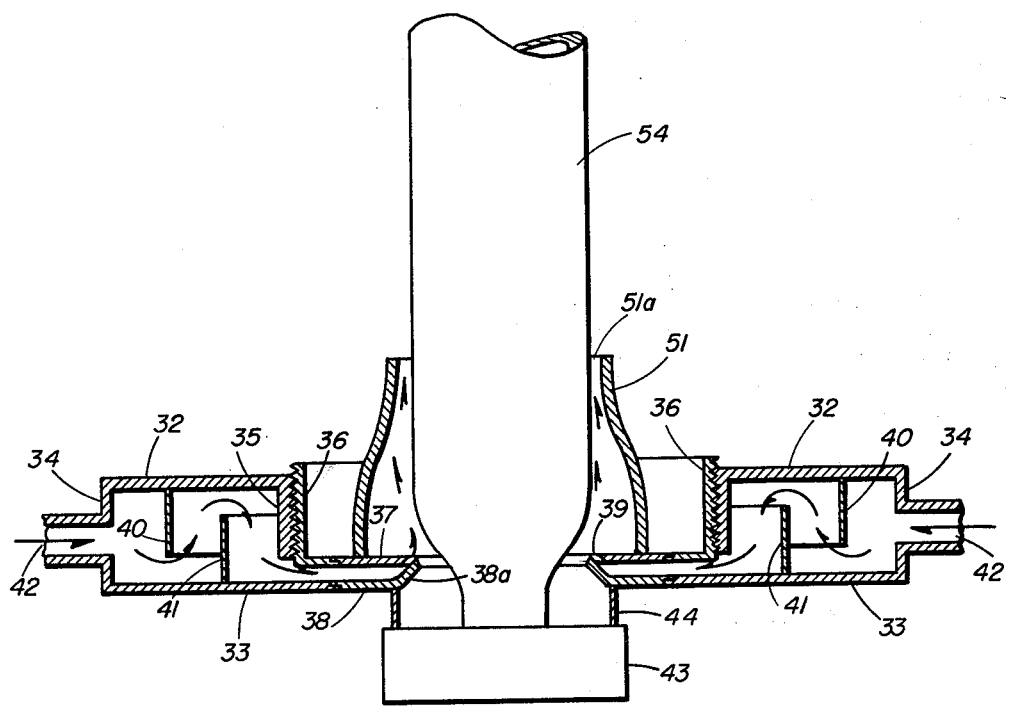
FIG. 3 is a view, similar to that of FIG. 1, of another form of the apparatus as applied to the mandrel type die structure.

In the structure according to FIG. 3, the plenum chamber is a hollow annular structure including annular wall portions 32 and 33, spaced by means of a cylindrical side wall portion 34 secured between them at their outer peripheral edges. A cylindrical ring 35 is secured to the inner peripheral edge of the annular wall portion 32, so as to extend toward the wall portion 33. The ring 35 on wall portion 32 terminates in spaced relation to the inner face of the wall portion 33 whereby to define a continuous slot between them. The outwardly exposed face of the ring 35 is threaded to receive a threaded adjustable support collar 36 which is adapted to support a first annular orifice plate 37. A second annular orifice plate 38 is supported at its outer periphery by the wall portion 33, along the inner peripheral edge thereof. The inner peripheral edge of the plate 38 includes a lip or rim portion 38a. This rim is disposed in relation to the plane of the plate at an angle which permits an establishment of cooperative relation between the inner peripheral edge of the first plate 37 and the inner face of the rim 38a, whereby to define a circular discharge orifice 39. Preferably the rim 38a is related to the plane of the inner surface of plate 38 at an angle of between about 30° and 60°. The cross-sectional area of this orifice is variable by adjustment of the collar 36.

The space within the plenum chamber, defined by wall portions 32, 33 and 34 and the ring 35, is baffled by means such as annular baffles 40 and 41. The baffles are secured respectively to the wall portions 32 and 33 so that the baffle 40 extends into spaced relation to the wall portion 33, while the baffle 41 extends into spaced relation to the wall portion 32. One or more inlet conduits such as designated by the numeral 42, provide for passage of a gaseous heat exchange medium into the plenum chamber. The plenum chamber is supported in close proximity to the outlet of a die 43 in any suitable fashion, any space between the die face and the plenum chamber being closed as by means of a collar 44, concentric with the inner peripheries of the orifice plates 37 and 38, and face of the die 43.

In the apparatus according to FIG. 3 the primary zone of reduced pressure is defined internally of a truncated, generally coniform venturi throat element 51. The base of this element is secured to the outer surface of the orifice plate 37, and disposed so as to be in substantially coaxial alignment with the die orifice, and the plenum chamber discharge orifice. The outlet 51a of the throat element 51 has a diameter greater than that of the plenum chamber orifice 39, and as previously indicated with respect to the throat element 20 of FIG. 1, this dimension limits the expanded dimension of the film tube 54 drawn therethrough. Preferably the throat outlet 51a is shaped to present a curvilinear inner surface, flared radially outward, to a tubular film passed therethrough.

Although the high velocity air, discharged through the throat element 51 from the orifice 39, produces a somewhat reduced pressure zone in the area between the die face and the lip 38a, the primary zone of reduced pressure is produced within the throat element 51. The tubular extruded film 54 thus expands to the desired dimension in this primary zone.

Figure 4:
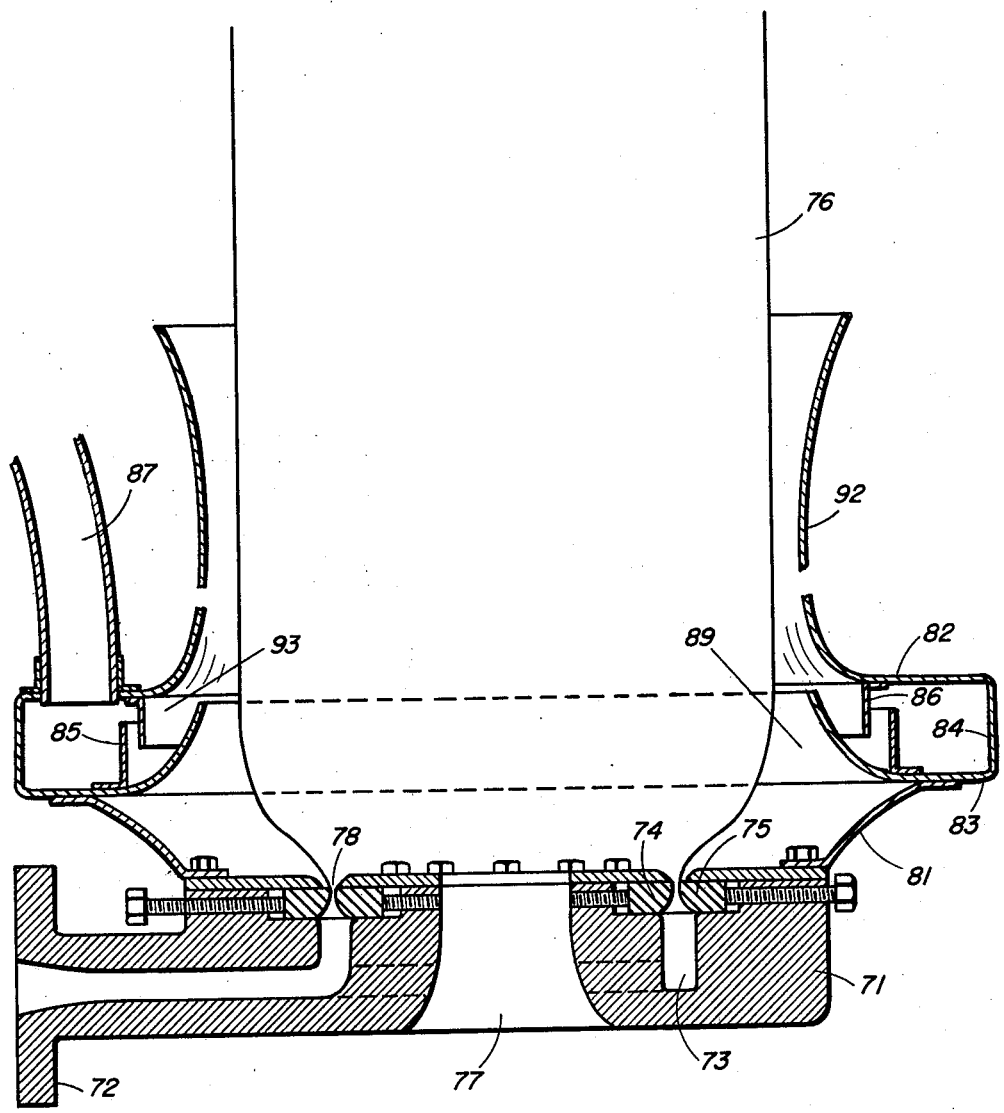
FIG. 4 is a similar view of a modified form of the apparatus shown by FIG. 1, as applied to an annular or do-nut type die structure for extruding blown tubular films.

In the structure illustrated by FIG. 4, the numeral 71 designates a representative form of a typical annular or do-nut die body for extruding thermoplastic materials. A nozzle 72 is adapted for connection to a conventional extruder head (not shown). An annular recess 73, defined in the body 71, in combination with die lips 74 and 75, provides for discharge of a molten thermoplastic material as a tubular film thereof. In FIG. 4, this film is designated by the numeral 76. As shown, the die body defines a central passageway 77 opening therethrough in concentric relation to the annular die orifice 78 defined between the die lips 74 and 75.

In accordance with the concepts of the present invention, the die body supports a plenum chamber, as by means of an annular, flared pan element 81. As in the structures previously described with reference to FIGS. 1 to 3 inclusive, the plenum chamber includes annular wall portions 82 and 83 joined and spaced by a cylindrical wall portion 84, as well as internal baffles 85 and 86 secured to the respective wall portions 83 and 82 substantially in the manner shown. An inlet and connecting conduit, designated by the numeral 87 provides for introduction of a gaseous heat exchange medium, such as air, into the plenum chamber. Although in the drawing, this conduit and inlet are shown as opening through the wall portion 82, provision may be made for introducing the gaseous medium through either the wall portion 83, or through the side wall 84, substantially as shown in FIG. 1.

In the structural form illustrated by FIG. 4, the inner peripheral edge of the wall portion 83 is flared angularly to provide a rim 89 adapted to extend in the direction of film draw from the die orifice. Also as illustrated by FIG. 4, the wall portion 82 forms an integral part of a venturi throat element 92, the wall portion 82 being a continuation of one outwardly flared end of the element 92 and adapted for a substantially parallel relationship to the wall portion 83. The flared portion of the throat element is adapted to define an annular orifice 93, in conjunction with the rim 89, whereby to direct an annular stream of a gaseous heat exchange medium toward the other end of the throat element, between the inner surface thereof and the outer surface of a tubular film drawn through the throat.

Although several forms of the apparatus have been shown, all have a common feature, namely a venturi throat, and means for discharging a high velocity stream of a heat exchange medium peripherally of a tubular film, drawn through the throat, in the direction of a discharge of said medium. By such means, a zone of reduced pressure is produced, initially, between the inner surface of the throat, and the outer surface of the tubular film drawn therethrough, and wherein a differential pressure between the inner and outer surfaces causes the tubular film to expand radially until this pressure differential is reduced to substantial balance. As a result of such expansion of the tubular film in close proximity to the die orifice, a greater surface area of smaller cross section is exposed to the heat exchange medium whereby to increase the rate of heat exchange, and consequent setting and stabilization of the film.

What is claimed is:

1. An apparatus for forming tubular films of molten thermoplastic materials, comprising, in combination with a die defining an annular orifice, an annular plenum chamber; a venturi throat having a relatively constant diameter portion; and means for passing a gaseous heat exchange medium through said venturi throat, at high velocity, by way of said plenum chamber, whereby to produce in said throat, a zone of subatmospheric pressure; means for supporting said plenum chamber and throat in closely spaced, radially closed relation to said die and said orifice; and means for drawing said tube through said venturi throat.

2. An apparatus according to claim 1, wherein said venturi throat has an inlet end portion, and is supported on said plenum chamber with said venturi throat inlet end portion disposed within said plenum chamber inner periphery, in radially spaced relation thereto.

3. An apparatus according to claim 1, wherein said plenum chamber includes a pair of parallel plane annular wall portions united and spaced at their outer peripheral edges by a cylindrical side wall portion, a first annular orifice plate supported at its outer peripheral edge by one said annular wall portion for adjustable movement in parallel relation to said other annular wall portion; a second annular orifice plate supported at its outer peripheral edge in fixed substantially co-planar relation to other wall portion, said second plate including a rim along its inner peripheral edge extended angularly from the plane of said plate toward that of said first plate, said first plate inner peripheral edge and said rim defining between them an annular discharge orifice opening from said plenum chamber; a venturi throat having an inlet end supported on said first orifice plate in substantially coaxial relation thereto; and means for introducing a pressurized stream of a gaseous heat exchange medium into said plenum chamber for discharge therefrom, by way of said annular orifice, through said venturi throat.

4. An apparatus according to claim 3, wherein said venturi throat is a hollow, substantially coniform element having a base end mounted on said first orifice plate.

5. An apparatus according to claim 1, wherein one said wall portion comprises an integral part of the inlet end of said venturi throat.

6. An apparatus according to claim 1, wherein said plenum chamber and venturi throat are adapted for combined relation to a mandrel-type die structure.

7. An apparatus according to claim 1, wherein said plenum chamber and venturi throat are adapted for combined relation to an annular die structure.

8. An apparatus for forming tubular films of molten thermoplastic materials, comprising, in combination with a die defining an annular orifice, an annular plenum chamber, means for supporting said plenum chamber in radially closed substantially coaxial relationship to said die and orifice, a substantially tubular enclosure element supported on said chamber in substantially coaxial relationship thereto and extending therefrom to open outwardly beyond said plenum chamber, means for passing a gaseous heat exchange medium through said enclosure at high velocity by way of said plenum chamber, whereby initially to produce a zone of sub-atmospheric pressure in said enclosure, and means for drawing a tube of molten thermoplastic material from said die orifice through said enclosure.

References Cited by the Examiner

UNITED STATES PATENTS

| 2,047,554 | 7/36 | Fischer | 18—14 |
| 2,926,384 | 3/60 | Hertz et al. | 18—14 |
| 2,947,031 | 8/60 | HoChow et al. | 18—145 |
| 3,009,208 | 11/61 | Pirot | 18—57 |
| 3,022,543 | 2/62 | Baird et al. | 18—57 |
| 3,061,876 | 11/62 | Lloyd et al. | 264—95 |
| 3,064,905 | 11/62 | Bonner | 18—14 |
| 3,079,636 | 3/63 | Aykanian | 18—14 |
| 3,088,167 | 5/63 | Corbett | 18—14 |

FOREIGN PATENTS

| 780,900 | 8/57 | Great Britain. |
| 805,858 | 12/58 | Great Britain. |

MICHAEL V. BRINDISI, *Primary Examiner.*

ALEXANDER H. BRODMERKEL, MORRIS LIEBMAN, *Examiners.*

Dedication 3,167,814.—*Herbert O. Corbett*, Canandaigua, N.Y. APPARATUS FOR FORMING BLOWN TUBULAR FILMS. Patent dated Feb. 2, 1965. Dedication filed, May 19, 1972, by the assignee, *National Distillers and Chemical Corporation*.

Hereby dedicates to the Public the entire term of said patent.

[*Official Gazette January 2, 1973.*]